United States Patent [19]

Lastnik

[11] Patent Number: 4,734,072

[45] Date of Patent: Mar. 29, 1988

[54] ANTI-EXPOSURE SUIT

[75] Inventor: Abraham L. Lastnik, Framingham, Mass.

[73] Assignee: Multi-Tech Corporation, Natick, Mass.

[21] Appl. No.: 833,652

[22] Filed: Feb. 24, 1986

Related U.S. Application Data

[63] Continuation of Ser. No. 566,679, Dec. 29, 1983, abandoned.

[51] Int. Cl.$^4$ .............................................. B63C 9/08
[52] U.S. Cl. ..................................... 441/105; 441/92; 441/98
[58] Field of Search ....................... 441/80, 87, 88, 92, 441/95–106, 108; 521/49, 917

[56] References Cited

U.S. PATENT DOCUMENTS

| | | | |
|---|---|---|---|
| 1,087,491 | 2/1914 | Herlihy | 441/103 |
| 1,113,074 | 10/1914 | Voegeli | 441/103 |
| 3,747,141 | 7/1973 | Crockford | 441/103 |
| 4,246,672 | 1/1981 | Fujiyama | 441/98 |
| 4,263,412 | 4/1981 | Pauls | 521/917 |
| 4,430,446 | 2/1984 | Lynn | 521/99 |
| 4,438,221 | 3/1984 | Fracalossi | 521/99 |

Primary Examiner—Joseph F. Peters, Jr.
Assistant Examiner—C. T. Bartz
Attorney, Agent, or Firm—Weingarten, Schurgin, Gagnebin & Hayes

[57] ABSTRACT

An anti-exposure suit is disclosed that protects a wearer against environments characterized by extremely cold temperatures. The suit comprises a coverall type garment including an outer layer of lightweight fluid impervious material and an inner fluid impervious layer defining an air-tight bladder therebetween for injection of gas to form an insulative layer between the wearer and the surrounding environment. In a preferred embodiment of the suit the inwardly facing surface of both the inner layer and the outer layer are highly reflective to minimize the loss of radiant heat. A life vest including pockets adapted for in place injection of buoyant material may be provided as an integral part of the suit or provided separately as an overgarment as desired. The outwardly facing surface of the outer layer may be provided with a highly visible surface to facilitate location of a wearer during a search and rescue operation.

6 Claims, 11 Drawing Figures

ANTI-EXPOSURE SUIT

This application is a continuation of application Ser. No. 566,679, filed 12-29-83, now abandoned.

FIELD OF THE INVENTION

This invention relates to survival suits and more specifically to a lightweight anti-exposure suit that protects a wearer against the onset of hypothermia in hostile environments of intense cold.

BACKGROUND OF THE INVENTION

In terms of accident per mile statistics, air travel is considered the safest means of travel, however, occasionally aircraft accidents do occur for a variety of reasons. As a result of extensive news coverage surrounding aircraft accidents, it is a widely held belief that most accidents result in total destruction of the craft and the demise of all aboard. While occasionally such accidents do occur, many aircraft accidents result in no fatalities, while other accidents result in numerous and avoidable fatalities. Avoidable fatilities typically arise due to the inhalation of smoke or toxic fumes prior to disembarcation from the craft or as the consequence of exposure to severe and adverse climatic conditions.

Considerable effort has been expended in terms of materials and systems aboard aircraft to minimize the threat of fire, smoke, or toxic fumes to passengers. Little effort, however, has been expended on means to protect passengers against accidental hypothermia as the result of exposure to intense cold such as occasioned by immersion in cold ocean waters.

It is mandated that aircraft which fly over water be equipped with life vests and other floatation devices for passengers and crew, however, no provisions are typically made to protect survivorsof an aircraft carrier from the debilitating effects of cold resulting from water immersion or resulting from a forced landing in an isolated area in high latitudes. In view of the great numbers of over-water flights, accidental hypothermia represents an omnipresent threat in civil aviation, even considering the admirable record of safety evidenced in recent years. In the northern hemisphere, for example, there are few places and times of the year when immersion conditions do not pose a threat to life due to hypothermia. Studies made by the Aerospace Medical Panel of the North Atlantic Treat Organization Advisory Group for Aerospace Research and Development (AGARD) recorded an annual mean value of only 92 days during which water temperatures in three northern bodies of water (Western Baltic, Heligoland Bight and the Atlantic Ocean off Brest) are greater than 15° C. (59° F.. Ocean waters off both coasts of the United States and Canada, depending upon latitude, range from 10° C. to 20° C. (50° F. to 68° F.) during the winter. It has been reported that, if an unprotected man were immersed to the shoulders in 15° C. (59° F. ) water, he could not be expected to survive for more than one to two hours since hypothermic death is likely to occur if the body core temperature drops below 28° C. (82° F.).

The concept of providing aircraft passengers and crew a means to protect themselves against accidental hypothermia upon the accidental downing of an aircraft is not of itself an original concept. Air crew on military over-water flights either wear or have ready access to anti-exposure clothing. However, it has been noted that such anti-exposure clothing is relatively bulky, making it too cumbersome and bulky for in-flight use. In civil aviation, it is not practical to require passengers to don such garments in anticipation of the remote likelihood that the garment would be needed.

Accordingly, there is need for an anti-exposure suit which is light, compact, easily stored, and provides protection against hypothermic injury or death. The need for a suit which provides such protection is not limited to situations in which immersion in frigid waters is possible since accidental hypothermia may result in any environment of extreme cold, such as may be found in the latitudes of northern and southern hemispheres, on isolated mountain tops, or when individuals may be stranded in snow. It is further desirable that such a garment be particularly adapted to facilitate visual sighting of a wearer and thereby increase the probability of rescue.

SUMMARY OF THE INVENTION

In accordance with the present invention an anti-exposure suit is disclosed that protects a wearer from intense cold such as occasioned by immersion in frigid ocean waters, the protection afforded by the suit avoiding or delaying hypothermic injury or death. The suit is fabricated of flexible lightweight material allowing the suit to be readily folded into a lightweight compact package for stowage aboard a ship, aircraft, in a backpack, or in any other suitable location.

The suit comprises a coverall type garment having an integral hood and face mask and includes an outer layer of lightweight fluid impervious material and an inner fluid impervious layer defining an airtight bladder therebetween for injection of gas to form an insulative layer for protection of a wearer against an extremely cold surrounding environment. At least one of the inwardly facing surfaces of the respective layers is provided with a highly reflective surface to minimize loss of radiant heat and in a preferred embodiment of the invention the inwardly facing surface of both the inner and outer suit layers are provided with a highly reflective surface. The outer garment layer may also be provided with a highly visible outwardly facing surface to facilitate location of a wearer during a search and rescue operation.

Gas cartridges are selectively disposed on the suit in convenient use locations and provide means for inflating the bladder between respective inner and outer suit layers. The gas cartridges may be actuated manually by a wearer or alternatively, may be automatically actuated upon the sensing of a specified environmental condition.

A life vest, may be integrated with the suit in accordance with the present invention or alternatively may be provided as a separate garment. The vest includes pockets adapted to receive a buoyant foam material with pockets selectively disposed to assure that a wearer floats in an upwardly facing orientation after injection of buoyant material into respective pockets. Foaming materials are disposed in appropriate containers and upon activation produce an exothermic foaming reaction to fill the foam receiving pockets and provide an initial source of heat to further prolong or assure wearer survival.

The garment, while primarily intended for ambulatory survivors of overwater aircraft accidents, is also adapted for use by totally or partially disabled survivors, and additionally, for protection of survivors of over land accidents or mishaps in extremely cold environments.

BRIEF DESCRIPTION OF THE DRAWINGS

The invention will be more fully understood by reference to the following detailed description in conjunction with the accompanying drawings in which.

DETAILED DESCRIPTION OF THE INVENTION

Figures 1, 2, 3:
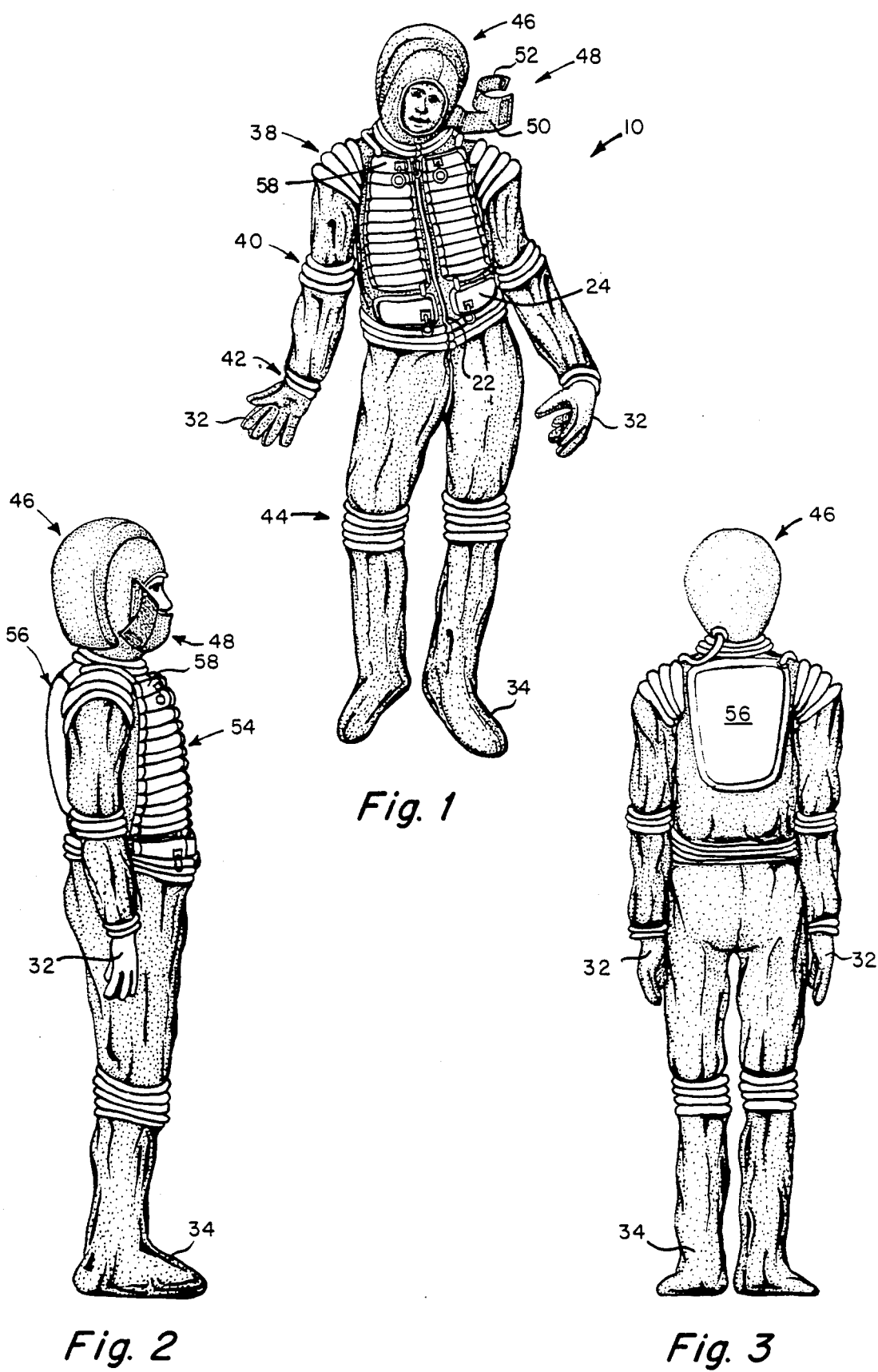
FIG. 1 is a pictorial front view of an anti-exposure suit in accordance with the present invention.
FIG. 2 is a side view of the suit of FIG. 1.
FIG. 3 is a rear view of the suit of FIG. 1.

Now referring to FIGS. 1 through 10, an anti-exposure suit, generally designated at 10, is disclosed which affords a wearer protection against extremely cold environments. The suit 10 comprises a multilayered garment which may be compactly folded for stowage aboard a ship, aircraft, in a backpack or other convenient and accessible location and which may be unfolded and donned quickly in the event of an appropriate emergency or life threatening situation.

More specifically, the suit 10, in accordance with the present invention is a coverall type garment having an outer layer 12 adapted to cover substantially the entire body of a wearer. Watertight closures in the regions of the neck, wrists and ankles are provided to restrict influx of frigid air or sea water in these regions. The outer layer 12, comprises a layer impervious to fluids and may be fabricated of rip-stop nylon coated with rubber or any other suitable fluid impermeable coating, a nylon, polyethyline or vinyl film supported with a fabric backing or unsupported, or any other lightweight, durable, fluid impermeable layer.

Disposed within the outer layer 12 is an inner layer adapted to cover substantially the entire body of the wearer. The inner layer 14 is seamed to the outer layer 12 along a selected path so as to form an airtight bladder 16 between the inner layer 14 and the outer layer 12. The inner layer 14 comprises a fluid impermeable layer such as rip-stop nylon coated with rubber or other suitable fluid impermeable coating, a nylon, polyethyline, or vinyl film and may have a supporting fabric backing or be unsupported. In a preferred embodiment of the suit illustrated in FIGS. 10 and 11, the bladder 16, is subdivided into plural cavities 18 having orifices 20 interconnecting ones of the cavities to permit inflation of selected cavities from one or more sources of pressurized gas.

A central closure 22 is provided on the frontal portion of the suit 10 to permit ease of suit entry. The closure 22 is a watertight closure of any type well known in the art such as a waterproof zipper.

One or more pressurized gas cartridges 24 are disposed on the suit 10 in convenient use locations. The gas cartridges 24 typically contain pressurized air, carbon dioxide, or any other suitable pressurized gas. Ducting is provided to permit inflation of selected areas of the bladder upon activation of the gas cartridge to release pressurized gas within the cartridge 24. The gas cartridges 24 are typically activated manually by the wearer. Alternatively, a sensor may be included which is operative to actuate the cartridges 24 upon sensing a predetermined environmental condition.

At least one of the layers is provided with a highly reflective inwardly facing surface which serves to reflect radiant heat and thereby minimize radiant heat loss. In a preferred embodiment of the suit, both the inwardly facing surface 26 of the outer layer and the inwardly facing surface 28 of the inner layer are provided with a highly reflective surface to further minimize loss of radiant heat. The highly reflective surface or surfaces may be obtained by the use of vapor deposition techniques, coating of the respective layers, laminating a foil to the respective layers or via any other suitable technique.

Optionally, the outwardly facing surface 30 of the suit 10 may be provided with a highly visible surface to facilitate location of a wearer during a search and rescue operation. The outwardly facing surface 30 may be brightly colored so it is easily observable against the anticipated background color or alternatively may be provided with a highly reflective surface.

Figure 4A:
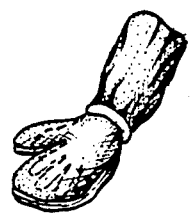
FIG. 4A is an insulative mitten for use with the present anti-exposure suit.
Figure 4B:
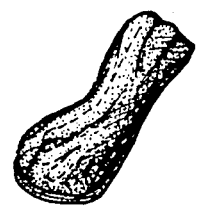
FIG. 4B is an alternative means defining a hand receiving pocket for protection of the hand of a wearer against extremely cold environments.
Figure 5:
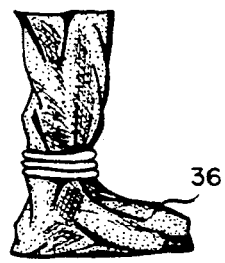
FIG. 5 shows a boot employed in accordance with the present invention.
Figure 7:
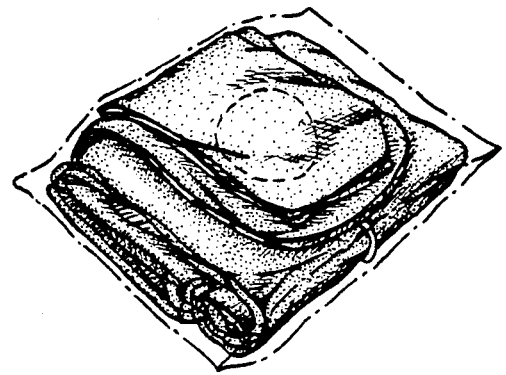
FIG. 7 illustrates the suit in accordance with the present invention fully folded and adapted for stowage.
Figure 6:
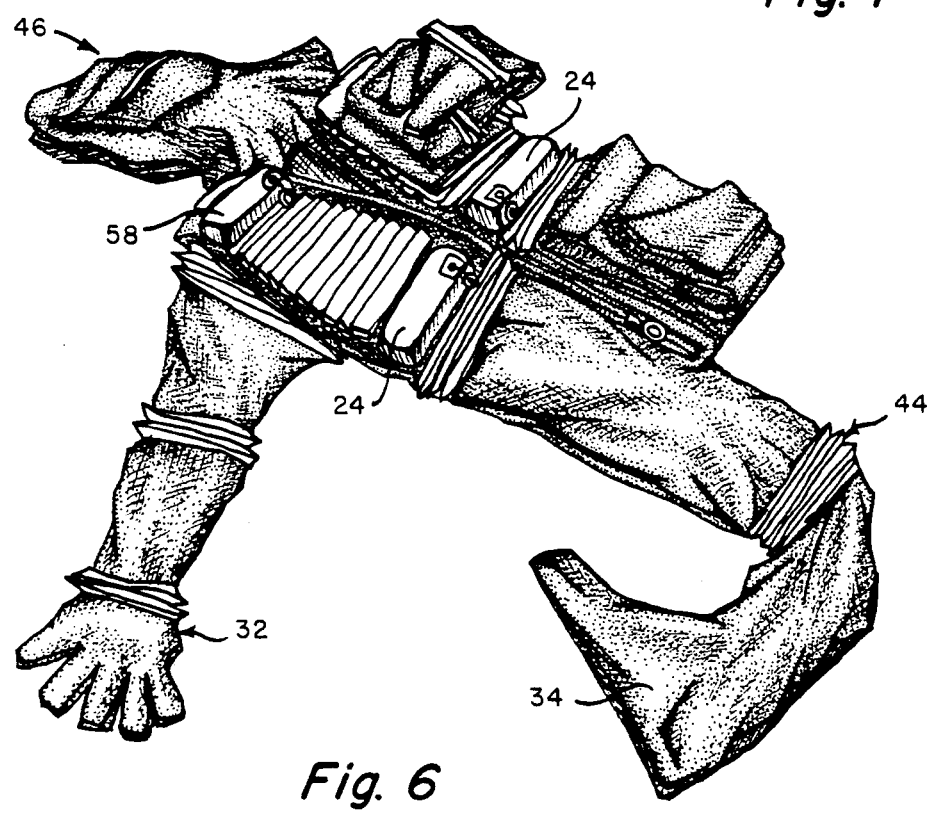
FIG. 6 illustrates the suit deflated and partially folded.
Figure 8:
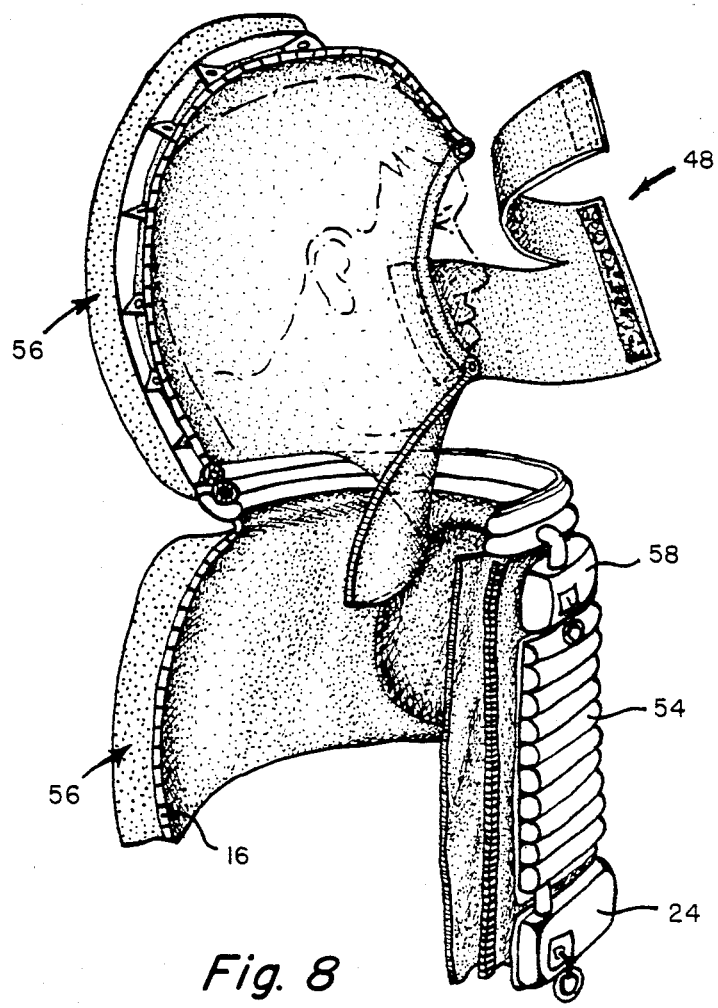
FIG. 8 is a partial cut-away view of the anti-exposure suit.
Figure 10:
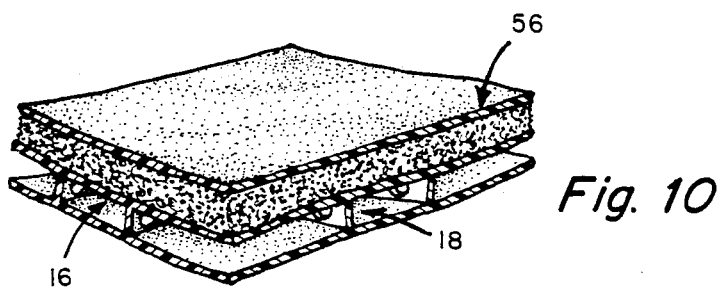
FIG. 10 is a partial cut-away view showing inner and outer layers of garment material defining insulative cavities therebetween.
Figure 9:
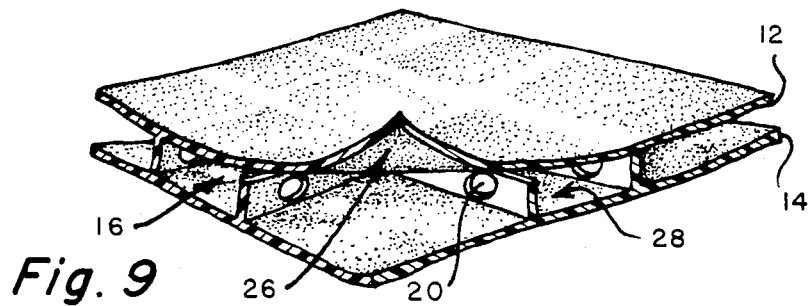
FIG. 9 illustrates cavities having communicative passages therebetween and bladder after injection of buoyant material.

As illustrated in FIGS. 1–3 the suit 10 may include integral gloves 32 or gloves separate from the suit 10. Alternatively, as shown in FIGS. 4A and 4B, hand receiving mittens may be provided which are non-integral or integral with the suit 10. Similarly, boots 34 may be included which are integral with the suit or nonintegral boots 36 may be provided as illustrated in FIG. 5.

To improve the mobility and comfort of a suit 10 wearer, articulation is typically provided in the shoulder regions 30, elbow regions 40 in the regions adjacent the wrists 42 and in the knee regions 44.

The suit 10 includes an integral hood 46 to afford environmental protection to the head of a wearer. The hood 46 includes a face flap 48 which may be disengageably fastened to the hood to cover the face of the wearer. The flap 48 may include a lower flap portion 50 and an upper flap portion 52 permitting the face of a wearer to be partially or fully covered as desired and dictated by the particular environment.

In one embodiment of the suit 10, pockets 54 and pockets 56 are provided which are adapted to receive a buoyant foam material. The pockets 54 are typically disposed on the frontal chest portion of the suit 10 and pockets 56 are located on the back of the hood 48 and along the upper back so as to impart floatation to a wearer upon injection of buoyant foam material into the respective pockets. The pockets 54 and 56 are selectively disposed on the suit such that a wearer will float in an upwardly facing orientation.

One or more cartridges 58 containing chemicals which foam when mixed are disposed on the suit in convenient use locations. Foaming chemicals produce an exothermic reaction upon mixing, thereby providing an initial source of heat. The heat generated upon activation of the cartridges 58 is vented within the suit 10 to further delay or prevent the onset of hypothermic injury. The cartridges 58 may be adapted for hand mixing of foaming reactants or alternatively may comprise cannisters which are pressurized to release reactants into respective foam receiving pockets upon activation. In cartridges adapted for hand mixing of reactants, the cartridges are provided with separate compartments and specific cartridge walls are of a thickness and material to permit the wall to be easily ruptured when squeezed by a user, thereby permitting mixing of the reactants contained within respective cartridge compartments. In an alternative cartridge embodiment, reactants are disposed in separate pressurized compartments, and reactants fill respective pockets 54 upon activation by use of a lanyard such as used with $CO_2$ cartridges. Any other suitable cartridge activation means may be employed to initiate mixing and foaming of the reactants.

Most foaming reactants foam at temperatures between 65 and 85 degrees F. The present reactants are selected to permit reaction at a low temperature and to permit a foaming reaction in an extremely cold environment. An auxiliary heat source in the form of a chemical heating element may be provided to produce sufficient heat for initiation and completion of the foaming reaction. The chemical heating element may be employed with either a cartridge 58 requiring hand mixing of reactants or a cartridge 58 containing pressurized reactants.

The cartridges 58 may be manually activated by a user as set forth above or alternatively, may be automatically actuated upon the sensing of a specific environmental condition.

In an alternative embodiment of the suit, a life vest in the form of a separate garment is employed which includes the above described foam receiving pockets and foaming cartridges for injection of buoyant material upon activation of the cartridge.

In the suit 10 embodiment including integral flotation or in the embodiment including a life vest as a separate overgarment, as an alternative or in addition to the cartridges 58, pockets 54 may be inflated manually by use of a hand operated pump (not shown), or by mouth. The provision of a manual inflation system in addition to cartridges 58 affords a wearer a means to impart flotation to the garment if for any reason the cartridges 58 should malfunction.

The above described invention is illustrative of a survival suit which may be compactly stored in a convenient location and closed in the event of an emergency to avoid or delay the onset of hypothermic injury. Other embodiments, modifications and departures from the present disclosure are possible without departing from the inventive concepts contained herein. Consequently, the invention is to be viewed as embracing each and every novel feature and novel combination of features present in or possessed by the invention herein disclosed, and is to be limited solely by the scope and spirit of the appended claims.

What is claimed is:

1. A survival suit comprising:
   an outer layer of lightweight gas and liquid impervious material adapted to cover substantially the entire body of a wearer;
   an inner layer of lightweight gas and liquid impervious material disposed within the outer layer and adapted to cover substantially the entire body of a wearer;
   said inner and outer layers selectively inter-connected to form a gas and liquid tight gas inflatable bladder therebetween; at least one of said layers having a highly reflective bladder facing surface to minimize radiant heat loss;
   means defining pockets selectively disposed on the suit and adapted to receive buoyant material to assure that a suit wearer floats in a upwardly facing orientation; and
   means providing a foaming reaction for producing a buoyant material for injection of said material into selected ones of said pockets.

2. The suit of claim 1 including 1 including means for ducting said buoyant material to selected ones of said pockets.

3. The suit of claim 2 wherein said foaming means includes reactions which foam at low temperatures when mixed.

4. The suit of claim 3 including a chemical heating element operative to permit initiation and completion of said foaming reaction.

5. A survival suit comprising:
   an outer layer of lightweight gas and liquid impervious material adapted to cover substantially the entire body of a wearer;
   an inner layer of lightweight gas and liquid impervious material disposed within the outer layer and adapted to cover substantially the entire body of a wearer;
   said inner and outer layers selectively inter-connected to form a gas and liquid tight gas inflatable bladder therebetween;
   at least one of said layers having a highly reflective bladder facing surface to minimize radiant heat loss;
   a vest of lightweight material including at least one pocket selectively disposed therein and adapted to receive a buoyant material;
   foaming means for producing a buoyant material for injection into said at least one pocket; and
   means for actuating said foaming means to cause injection of said buoyant material into said at least one pocket.

6. The suit of claim 5 wherein said actuating means is operative to automatically actuate said foaming means upon a sensing of a predetermined environmental condition.

* * * * *